US008472370B2

(12) United States Patent
Shin et al.

(10) Patent No.: US 8,472,370 B2
(45) Date of Patent: Jun. 25, 2013

(54) APPARATUS AND METHOD FOR TIMING SYNCHRONIZATION IN A COMMUNICATION SYSTEM

(75) Inventors: Seung-Woo Shin, Seoul (KR); Ki-Hyun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 646 days.

(21) Appl. No.: 12/658,038

(22) Filed: Feb. 1, 2010

(65) Prior Publication Data

US 2010/0195565 A1 Aug. 5, 2010

(30) Foreign Application Priority Data

Feb. 2, 2009 (KR) .................. 10-2009-0007898

(51) Int. Cl.
*H04J 3/08* (2006.01)

(52) U.S. Cl.
USPC ........................................ 370/326

(58) Field of Classification Search
USPC ......... 370/203, 204–215, 216–228, 229–240, 370/241–253, 254–271, 310–337, 338–350, 370/351–394, 395.1, 395.3, 395.4, 395.41, 370/395.42, 395.5, 395.52, 395.53, 412–421, 370/431–457, 458–463, 464–497, 498–522, 370/523–520, 521–529
See application file for complete search history.

(56) References Cited

U.S. PATENT DOCUMENTS

| 5,629,708 | A  | * | 5/1997 | Rodal et al. ............... 342/357.63 |
| 7,573,914 | B2 | * | 8/2009 | Ilnicki et al. .................. 370/519 |
| 7,590,151 | B2 | * | 9/2009 | Middleton et al. ........... 370/516 |
| 7,643,595 | B2 | * | 1/2010 | Aweya et al. ................ 375/356 |
| 7,876,792 | B2 | * | 1/2011 | Wong et al. .................. 370/518 |
| 7,990,909 | B2 | * | 8/2011 | Brueckheimer ............. 370/324 |
| 8,010,138 | B2 | * | 8/2011 | Kuru ............................ 455/502 |
| 8,140,658 | B1 | * | 3/2012 | Gelvin et al. ................ 709/224 |
| 8,199,779 | B2 | * | 6/2012 | Sinha et al. .................. 370/503 |
| 2005/0207387 | A1 | * | 9/2005 | Middleton et al. ........... 370/347 |
| 2008/0080650 | A1 | * | 4/2008 | Adachi ........................ 375/355 |
| 2009/0147806 | A1 | * | 6/2009 | Brueckheimer ............. 370/503 |
| 2010/0111113 | A1 | * | 5/2010 | Wong et al. .................. 370/503 |

* cited by examiner

*Primary Examiner* — Jung-Jen Liu

(57) ABSTRACT

An apparatus is capable of restoring a clock of a second node in a communication system with a symmetric network construction of a first node that is capable of receiving a Global Positioning System (GPS) signal, and the second node that is not capable of receiving a GPS signal. The method includes identifying synchronization information received from the first node, determining a delay with the first node, generating a clock using the synchronization information and delay, removing a clock phase being out of a reference range in a phase identification interval, dividing the phase identification interval into at least two subdivision intervals, and removing a clock phase being out of a normal operation range of a phase in each subdivision interval.

22 Claims, 7 Drawing Sheets

APPARATUS AND METHOD FOR TIMING SYNCHRONIZATION IN A COMMUNICATION SYSTEM

CROSS REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Feb. 2, 2009 and assigned Ser. No. 10-2009-0007898, the contents of which are herein incorporated by reference.

TECHNICAL FIELD OF THE INVENTION

The present invention relates to an apparatus and method for performing timing synchronization between nodes in a communication system. More particularly, the present invention relates to an apparatus and method for performing timing synchronization of nodes not capable of receiving a Global Positioning System (GPS) synchronization signal in a communication system.

BACKGROUND OF THE INVENTION

In case that a node constituting a communication system is capable of receiving a GPS signal, the node restores and generates a clock based on frequency synchronization and timing synchronization acquired through the GPS synchronization signal. Here, a master node denotes the node capable of receiving the GPS signal.

Alternatively, in case that a node constituting the communication system is not capable of receiving a GPS signal, the node restores and generates a clock based on frequency synchronization and timing synchronization acquired through synchronization information received from the master node. Here, a slave node denotes the node not capable of receiving the GPS signal.

The slave node acquires synchronization information from packets received from the master node. Thus, if a traffic load increases, there is a problem that the slave node suffers a phase jump as illustrated in FIG. 1 due to a transmission delay of the packets including the synchronization information.

FIG. 1 is a graph that illustrates a variation of a clock phase dependent on a traffic load in a communication system according to the conventional art.

As illustrated in FIG. 1, if a traffic load 100 increases suddenly, a slave node experiences the problem of a clock phase 110 jumping due to a transmission delay of packets that include synchronization information.

Another problem is that a phase jump or phase deviation which interferes with phase synchronization in the slave node occurs due to a phase difference that results from physical and temporal difference of a network path.

SUMMARY OF THE INVENTION

To address the above-discussed deficiencies of the prior art, it is a primary object to provide at least the advantages below. Accordingly, one aspect of the present invention is to provide an apparatus and method for restoring a clock of a node not capable of receiving a Global Positioning System (GPS) synchronization signal in a communication system.

Another aspect of the present invention is to provide an apparatus and method for timing synchronization of a node not capable of receiving a GPS synchronization signal in an in-building system.

Yet another aspect of the present invention is to provide an apparatus and method for timing synchronization of a node not capable of receiving a GPS synchronization signal, and for improving a variation of a phase deviation value dependent on a variation of a traffic load in a communication system.

Still yet another aspect of the present invention is to provide an apparatus and method for minimizing an offset with a Universal Time Coordinated (UTC) at the time of restoring a clock of a node that is not capable of receiving a GPS synchronization signal in a communication system.

The above aspects are achieved by providing an apparatus and method for timing synchronization in a communication system.

According to one aspect of the present invention, a method for restoring a clock of a second node in a communication system with a symmetric network construction of a first node capable of receiving a Global Positioning System (GPS) signal, the second node not capable of receiving a GPS signal, is provided. The method includes identifying synchronization information received from the first node, determining a delay with the first node, generating a clock using the synchronization information and delay, removing a clock phase being out of a reference range in a phase identification interval, dividing the phase identification interval into at least two subdivision intervals, and removing a clock phase being out of a normal operation range of a phase in each subdivision interval.

According to another aspect of the present invention, an apparatus for restoring a clock of a second node in a communication system with a symmetric network construction of a first node capable of receiving a GPS signal, the second node not capable of receiving a GPS signal, is provided. The apparatus includes a transmission/reception interface, a delay determiner, a clock generator, and a clock corrector. The transmission/reception interface transmits/receives a signal with the first node. The delay determiner determines a delay with the first node. The clock generator generates a clock using synchronization information received from the first node through the transmission/reception interface and the delay determined in the delay determiner. The clock corrector removes a phase of a clock being out of a reference range in a phase identification interval among clocks generated in the clock generator, and removes a clock of a phase being out of a normal operation range in each of at least two subdivision intervals dividing the phase identification interval.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Various embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

A technology for restoring a clock of a node not capable of receiving a Global Positioning System (GPS) synchronization signal in a communication system according to an embodiment of the present invention is described below.

Figure 1:
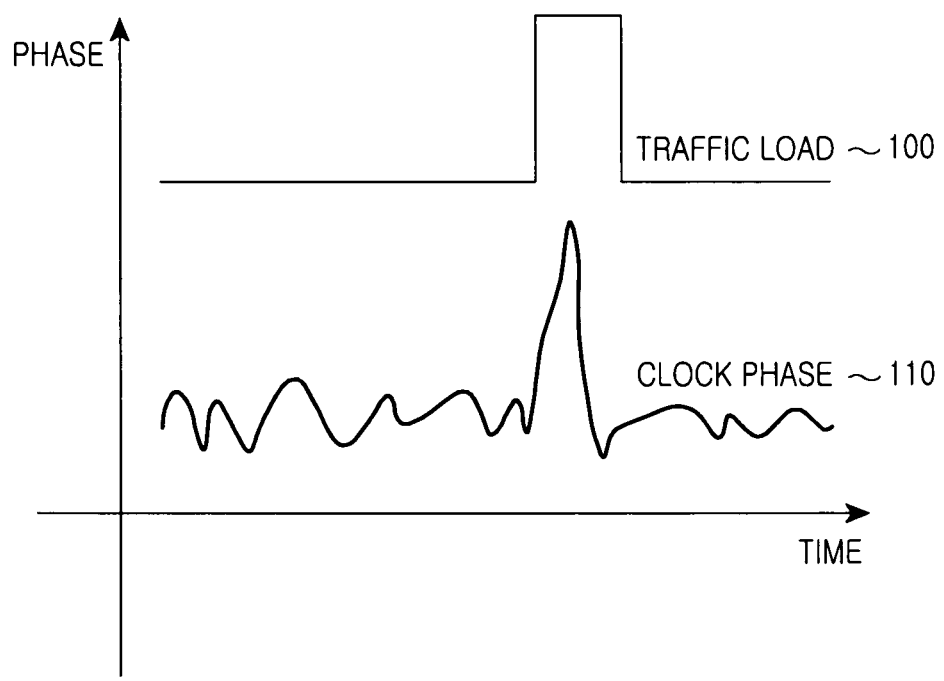
FIG. 1 illustrates a variation of a clock phase dependent on a traffic load in a communication system according to the conventional art.
Figure 2:
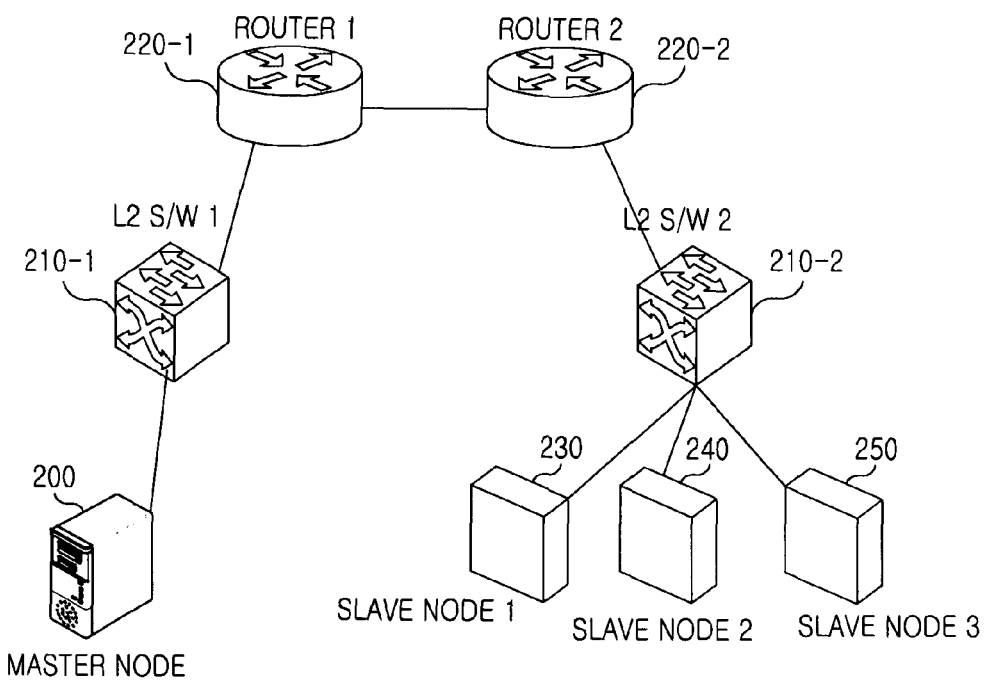
FIG. 2 illustrates a construction of a communication system according to an embodiment of the present invention.

In the following description, a communication system has to construct a symmetric network as illustrated in FIG. 2 for the sake of timing synchronization of a slave node. Here, the slave node represents a node for restoring and generating a clock based on synchronization information received from a master node because the slave node is not capable of receiving a GPS signal. The master node represents a node for receiving a GPS signal.

FIG. 2 illustrates a construction of a communication system according to the present invention.

As illustrated in FIG. 2, the communication system includes a master node 200, Layer 2 switches (L2 S/W) 210-1 and 210-2, routers 220-1 and 220-2, and slave nodes 230, 240, and 250.

The communication system constructs a symmetric network to minimize an error resulting from a delay of transmission/reception packets of the master node 200 and slave nodes 230, 240, and 250.

Figure 3:
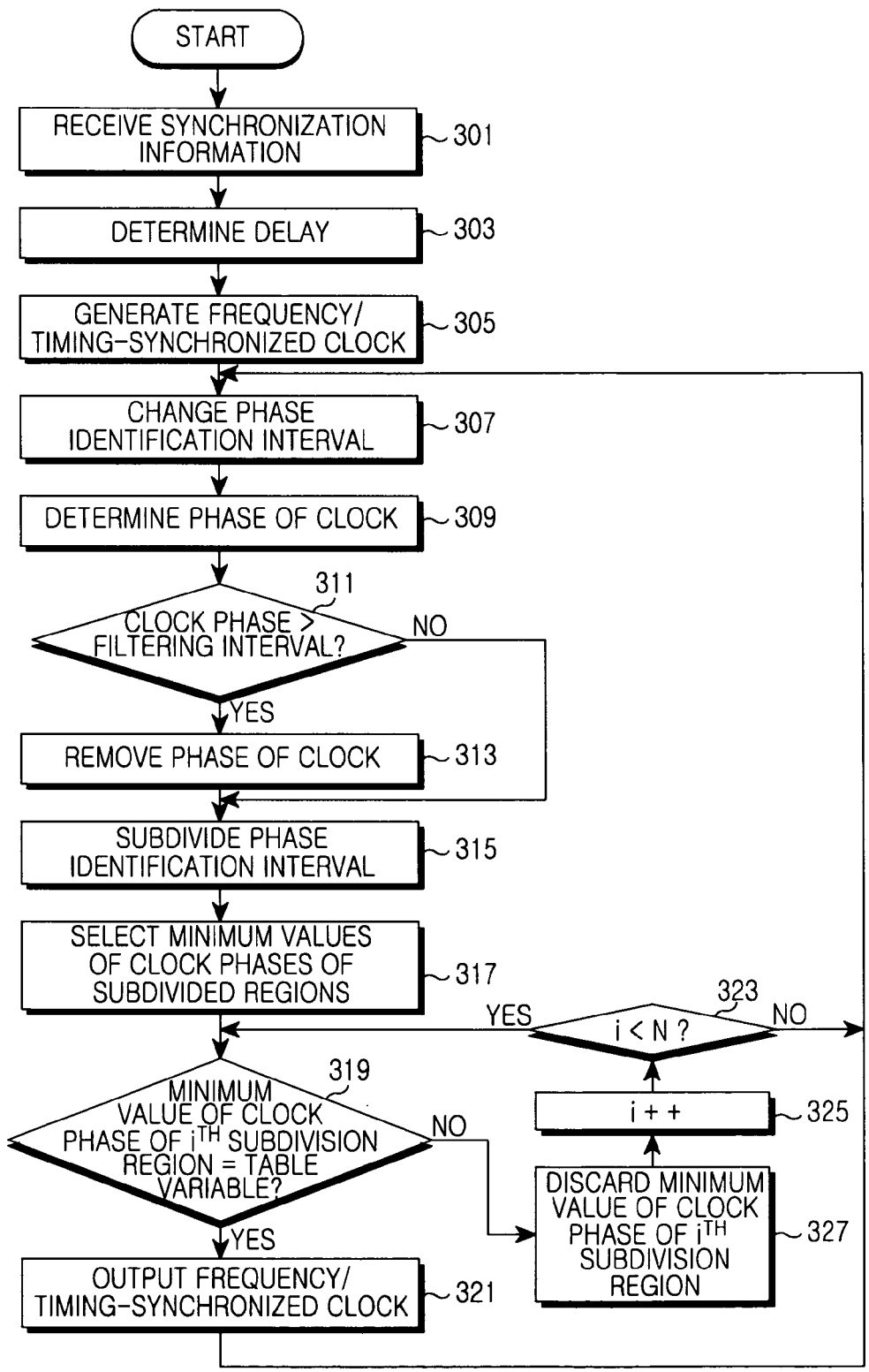
FIG. 3 illustrates a process for restoring a clock in a communication system according to an embodiment of the present invention.

If the symmetric network is constructed as described above, the slave nodes 230, 240, and 250 synchronize frequency/timing as illustrated in FIG. 3.

FIG. 3 illustrates a process for restoring a clock in a communication system according to an embodiment of the present invention.

Referring to FIG. 3, in step 301, a slave node receives packets including synchronization information from a master node.

After receiving the packets including the synchronization information from the master node, the slave node proceeds to step 303 and determines a delay with the master node. For example, the slave node transmits a delay request message including information on a packet reception time to the master node. The master node transmits a response message to the slave node in response to the delay request message. Here, the response message includes information on a time at which the master node receives the delay request message and a time at which the master node transmits the response message. The slave node can determine the delay with the master node using the information on the time at which the master node receives the delay request message and the time at which the master node transmits the response message, which are determined in the response message received from the master node.

After that, the slave node proceeds to step 305 and generates a clock using the synchronization information provided in step 301 and the delay information determined in step 303. That is, the slave node determines frequency synchronization and timing synchronization using the synchronization information and delay information and then, generates a clock using the frequency synchronization and timing synchronization.

After generating the clock, the slave node proceeds to step 307 and changes a phase identification interval. That is, the slave node increases the phase identification interval.

After increasing the phase identification interval, the slave node proceeds to step 309 and determines a phase of a clock included in the changed phase identification interval.

Then, the slave node proceeds to step 311 and determines whether the phase of the clock included in the phase identification interval determined in step 309 deviates from a filtering interval. Here, the filtering interval is set with an error of ±α on the basis of an average phase of clocks measured during a predetermined period of time.

Figure 5:
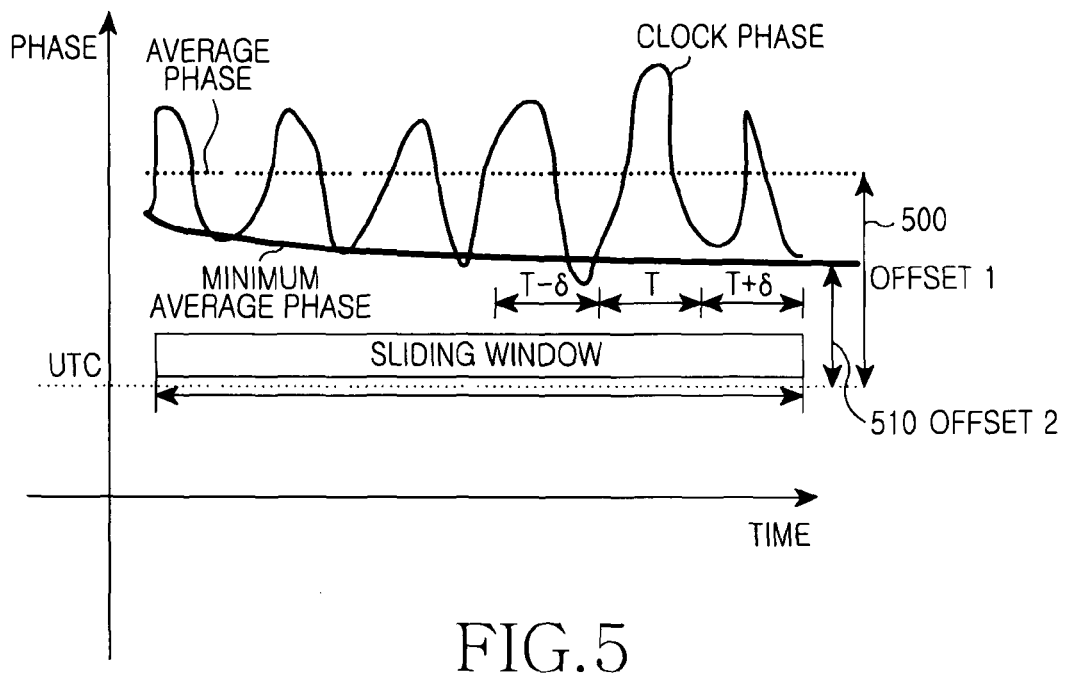
FIG. 5 illustrates a process of setting an offset with a Universal Time Coordinated (UTC) to the minimum in a node for restoring a clock according to an embodiment of the present invention.

If the clock phase is within the filtering interval in step 311, the slave node proceeds to step 315 and subdivides the phase identification interval by a predetermined size. For example, the slave node subdivides the phase identification interval by 'T' value as illustrated in FIG. 5.

Alternatively, if the clock phase is out of the filtering interval in step 311, the slave node recognizes that a phase jump has occurred. Accordingly, the slave node proceeds to step 313 and removes the clock phase that is out of the filtering interval. For instance, the slave node removes the clock phase that is out of the filtering interval as illustrated in FIG. 4.

Then, the slave node proceeds to step 315 and subdivides the phase identification interval by a predetermined size. For instance, the slave node subdivides the phase identification interval by 'T' value as illustrated in FIG. 5.

After subdividing the phase identification interval, the slave node proceeds to step 317 and selects the minimum value of a clock phase in a subdivision region of the phase identification interval. For example, the slave node selects the minimum value of a clock phase of each subdivision region as illustrated in FIG. 5.

Figure 6:
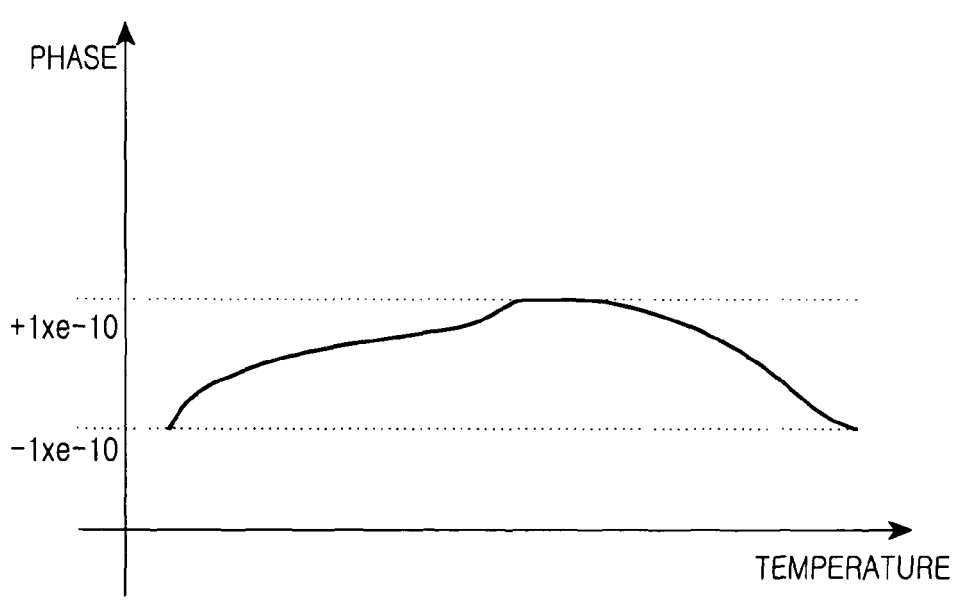
FIG. 6 illustrates a lookup table according to an embodiment of the present invention.

Then, the slave node proceeds to step 319 and determines whether the minimum value of a clock phase of an $i^{th}$ subdivision region is included in a lookup table. Here, the lookup table includes phase information for normally operating the slave node. For example, the lookup table includes phase information for normally operating the slave node based on a temperature as illustrated in FIG. 6.

If the minimum value of the clock phase of the $i^{th}$ subdivision region is not included in the lookup table in step 319, the slave node proceeds to step 327 and discards the minimum value of the clock phase of the $i^{th}$ subdivision region.

Then, the slave node proceeds to step 325 and increases an index (i) of the $i^{th}$ subdivision region by 'i++'.

After increasing the index (i) of the subdivision region, the slave node proceeds to step 323 and determines whether the minimum values of clock phases for all subdivision regions that were included in the phase identification interval have been compared with the lookup table. Thus, the slave node compares the index (i) of the clock phase of the $i^{th}$ subdivision region, with the total number (N) of subdivision regions included in the phase identification interval.

If the index (i) of the $i^{th}$ subdivision region is equal to or is greater than the total number (N) of the subdivision regions ($i \geq N$), the slave node recognizes that the minimum values of clock phases for all the subdivision regions included in the phase identification interval have been compared with the lookup table. Thus, the slave node returns to step 307 and changes the phase identification interval.

Alternatively, if the index (i) of the $i^{th}$ subdivision region is less than the number (N) of the subdivision regions (i<N), the slave node recognizes that not all of the minimum values of the clock phases for all the subdivision regions that were included in the phase identification interval have been compared with the lookup table. Thus, the slave node returns to step 319 and determines whether the minimum value of a clock phase of an $i^{th}$ subdivision region is included in the lookup table.

If the minimum value of the clock phase of the $i^{th}$ subdivision region is included in the lookup table in step 319, the slave node proceeds to step 321 and outputs a clock that is frequency/timing-synchronized by the clock phase of the minimum value included in the lookup table.

Then, the slave node terminates the procedure according to the embodiment of the present invention.

In the aforementioned embodiment, the slave node ignores the clock phase that is outside of the filtering interval. In another embodiment, a slave node may output an average value of clock phases in place of a clock phase that is outside of the filtering interval.

Also, in the aforementioned embodiment, the slave node discards the clock phase that is not included in the lookup table. In another embodiment, a slave node may instead use the minimum average value of clock phases in place of a clock phase that is not included in the lookup table.

Figure 4A:
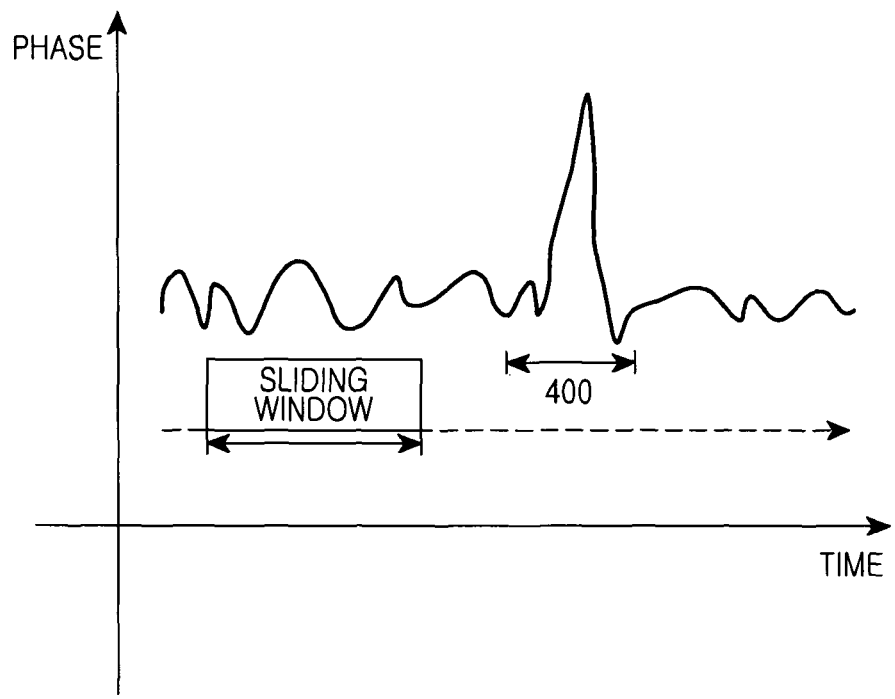
FIGS. 4A and 4B illustrate a process of phase filtering for preventing a phase jump in a node for restoring a clock according to an embodiment of the present invention.
Figure 4B:
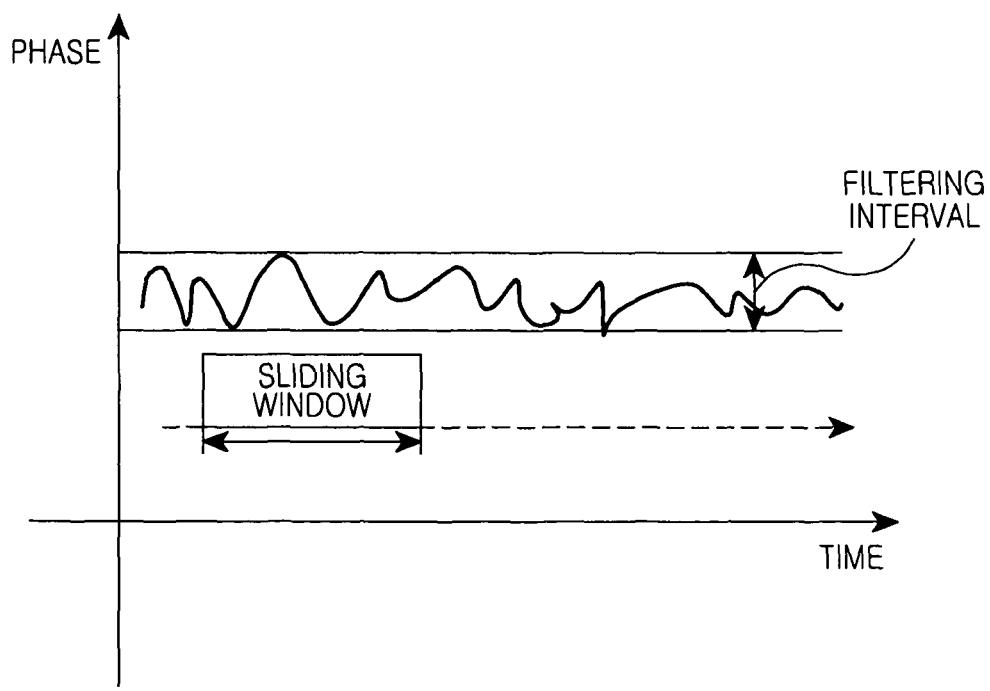

FIGS. 4A and 4B are graphs that illustrate a process of phase filtering for preventing a phase jump in a node for restoring a clock according to an embodiment of the present invention.

FIG. 4A illustrates a clock phase before the phase filtering, and FIG. 4B illustrates a clock phase after the phase filtering.

In the absence of the phase filtering as in FIG. 4A, a phase jump (400) occurs due to a delay of packets transmitted from a master node.

In the existence of the phase filtering in a slave node, a clock of a stable phase can be obtained by minimizing a phase deviation as illustrated in FIG. 4B.

FIG. 5 is a graph that illustrates a process of setting an offset with a Coordinated Universal Time (UTC) to the minimum in a node for restoring a clock according to an embodiment of the present invention.

As illustrated in FIG. 5, a phase of a clock generated in a slave node suffers an offset with a UTC due to a signal delay.

Accordingly, the slave node continuously performs a comparison between sampling values (T−δ, T) and (T, T+δ) and determines the minimum clock phases of subdivision regions of a phase identification interval. Then, the slave node calculates the minimum average phase value between the minimum clock phases through a vector component and reflects the calculated minimum average phase value in a final output clock.

If the minimum average phase value of the clock phases is reflected in the final output clock as above, an offset 510 with a UTC is less than an offset 500 based on the average phase value, thus being capable of increasing a timing accuracy.

FIG. 6 illustrates a lookup table according to an embodiment of the present invention.

As illustrated in FIG. 6, a slave node stores a lookup table including a temperature of an operation temperate range and phase information dependent on the temperature. That is, the lookup table stores the phase information dependent on the operation temperature.

The following description is for a construction of a slave node for synchronizing frequency/timing using synchronization information received from a master node.

Figure 7:
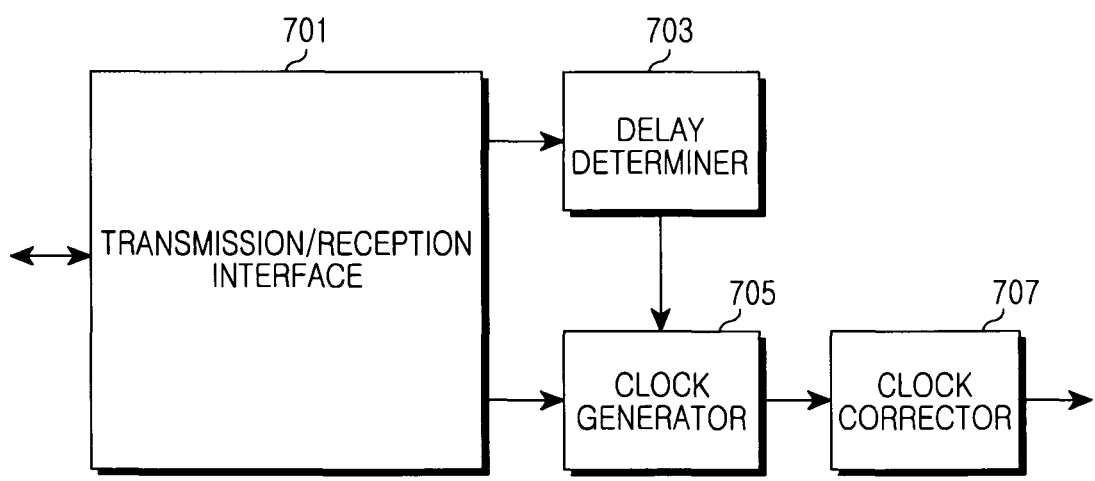
FIG. 7 illustrates a construction of a node for restoring a clock in a communication system according to an embodiment of the present invention.

FIG. 7 illustrates a construction of a slave node for restoring a clock in a communication system according to the present invention.

As illustrated in FIG. 7, the slave node includes a transmission/reception interface 701, a delay determiner 703, a clock generator 705, and a clock corrector 707.

The transmission/reception interface 701 transmits/receives a signal with a master node through a wired network. For example, the transmission/reception interface 701 receives packets including synchronization information from the master node through an Internet Protocol (IP) backhaul.

The delay determiner 703 determines a delay with the master node that transmits synchronization information. For example, the delay determiner 703 transmits a delay request message to the master node through the transmission/reception interface 701. The master node transmits back to the slave node a delay response message that includes a request receive time, at which the master node received the delay request message, and a response transmit time at which the master note transmitted the delay response message. Then, the delay determiner 703 receives the delay response message through the transmission/reception interface 701. The delay determiner 703 determines the delay with the master node using a request transmit time at which the delay request message was transmitted by the slave node, the request receive time at which the master node receives the delay request message, the response transmit time at which the master node transmits the delay response message, and a response receive time at which the delay response message was received by the slave node. Here, the delay determiner 703 determines the delay with the master node when synchronization information is received through the transmission/reception interface 701.

The clock generator 705 generates a frequency/timing-synchronized clock using the synchronization information received from the transmission/reception interface 701 and the delay information with the master node received from the delay determiner 703.

The clock corrector 707 improves and outputs a variation of a phase deviation value of the clock generated in the clock generator 707. For example, the clock corrector 707 is constructed as illustrated in FIG. 8.

Figure 8:
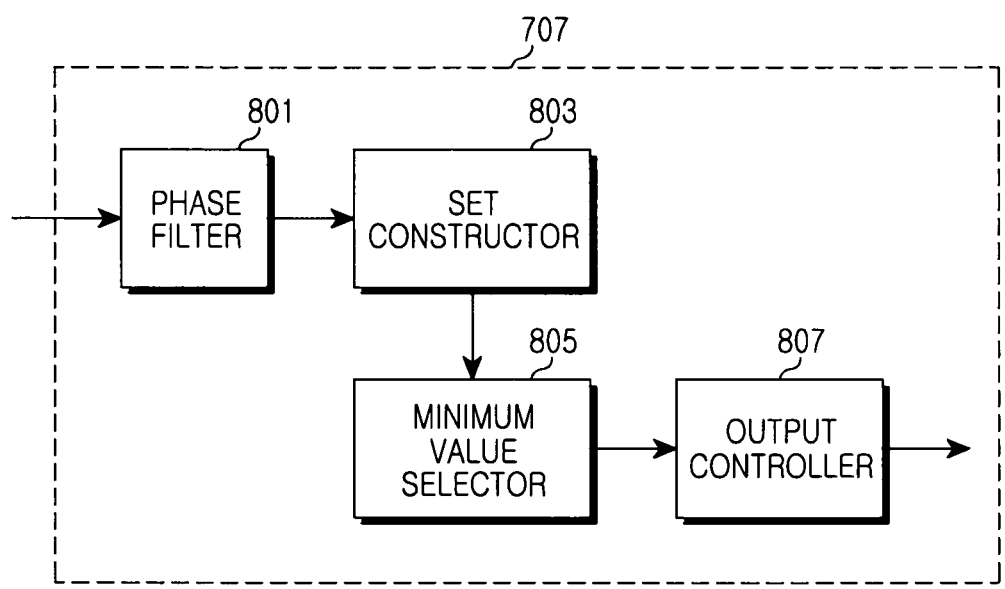
FIG. 8 illustrates a detailed construction of a clock corrector of a node for restoring a clock according to an embodiment of the present invention.

FIG. 8 illustrates a detailed construction of a clock corrector 707 of a node for restoring a clock according to an embodiment of the present invention.

As illustrated in FIG. 8, the clock corrector 707 includes a phase filter 801, a set constructor 803, a minimum value selector 805, and an output controller 807.

The phase filter 801 filters out a clock phase from a clock generated in the clock generator 705 when the clock phase value falls outside a filtering interval. For example, as illustrated in FIG. 4, the phase filter 801 compares a phase of a clock included in a phase identification interval with a filtering interval and filters a clock phase. Here, the filtering interval is set with an error of $\pm\alpha$ on the basis of an average phase of a clock measured during a predetermined period of time.

The set constructor 803 subdivides a phase identification interval by a predetermined size. For example, the set constructor 803 subdivides the phase identification interval by a 'T' value as illustrated in FIG. 5.

The minimum value selector 805 selects the minimum value of a clock phase for respective subdivision regions subdividing the phase identification interval in the set constructor 803. For example, as illustrated in FIG. 5, the minimum value selector 805 continuously performs a comparison between sampling values (T--δ, T) and (T, T380 δ) and selects the minimum clock phases of the subdivision regions.

The output controller 807 compares the minimum clock phases of the subdivision regions selected in the minimum value selector 805 with a lookup table and determines a clock phase to output. For instance, the output controller 807 outputs the minimum clock phase included in the lookup table.

In the aforementioned embodiment, the phase filter 801 ignores the clock phase that is outside of the filtering interval. In another embodiment, a phase filter 801 may output an average value of clock phases in place of a clock phase that is outside of the filtering interval.

Also, in the aforementioned embodiment, the output controller 807 ignores a minimum value of the clock phase that is not included in the lookup table. In another embodiment, the output controller 807 may output the minimum average value of clock phases in place of a minimum value of the clock phase that is not included in the lookup table.

In the aforementioned embodiment, a slave node performs all of phase filtering, minimizing of an offset with a UTC, and comparing of a clock phase with a lookup table, and corrects a clock. In another embodiment, the slave node can also correct a clock using one or two of the three clock correction schemes.

As described above, an embodiment of the present invention, by improving a variation of a phase deviation value due to a change of a traffic load and restoring and generating a clock of a node not capable of receiving a GPS signal, is capable of achieving timing synchronization and realizing a cheap stable synchronization through an IP network in an in-building system.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for restoring a clock of a second node in a communication system with a symmetric network construction of a first node configured to receive a Global Positioning System (GPS) signal, the second node not configured to receive the GPS signal, the method comprising:
   receiving synchronization information from the first node;
   determining a delay of the clock relative to the first node;
   generating the clock using the synchronization information and the delay;
   removing a clock phase that is out of a reference range in a phase identification interval;
   dividing the phase identification interval into at least two subdivision intervals;
   selecting a minimum clock phase value from each subdivision interval; and
   removing the minimum clock phase value that is out of a specified normal operation range for each subdivision interval.

2. The method of claim 1, wherein receiving the synchronization information comprises receiving synchronization information comprised in packets from the first node through a wired network.

3. The method of claim 1, wherein determining the delay comprises:
   transmitting a delay request message to the first node;
   in response to receiving a delay response message from the first node, identifying, in the delay response message, a request receive time at which the first node receives the delay request message and a response transmit time at which the first node transmits the delay response message; and
   determining the delay with the first node using a request transmit time at which the delay request message was transmitted, a response receive time at which the delay response message was received, the request receive time, and the response transmit time.

4. The method of claim 1, wherein removing the clock phase that is out of the reference range comprises:
   determining the clock phase comprised in the phase identification interval; and
   removing the clock phase that is out of the reference range in the phase identification interval.

5. The method of claim 1, wherein removing the clock phase that is out of the reference range comprises:
   determining the clock phase comprised in the phase identification interval; and
   replacing the clock phase that is out of the reference range in the phase identification interval with an average clock phase value.

6. The method of claim 1, wherein the reference range is set to have a specified error range based on an average of clock phases over a specified period of time.

7. The method of claim 1, wherein removing the clock phase that is out of the specified normal operation range comprises:
   determining, for each subdivision interval, whether the minimum clock phase value is included in a table comprising phase information for normal operation of the second node; and discarding the minimum clock phase value that is not included in the table.

8. The method of claim 7, wherein the table comprises clock phase information arranged by normal operation temperatures of the second node.

9. The method of claim 1, wherein removing the clock phase that is out of the specified normal operation range comprises:
   determining, for each subdivision interval, whether the minimum clock phase value is included in a table comprising phase information for normal operation of the second node; and
   replacing the minimum clock phase value that is not included in the table with an average minimum clock phase value.

10. The method of claim 9, wherein the average minimum clock phase value is continuously calculated using a vector component.

11. The method of claim 1, further comprising, outputting a clock when the minimum clock phase value is within the specified normal operation range.

12. An apparatus configured to restore a clock of a second node in a communication system with a symmetric network construction of a first node configured to receive a Global Positioning System (GPS) signal, the second node not configured to receive a GPS signal, the apparatus comprising:
   an interface configured to communicate with the first node;
   a delay determiner configured to determine a delay of the clock relative to the first node;
   a clock generator configured to generate the clock using synchronization information received from the first node through the interface and the delay determined in the delay determiner; and
   a clock corrector configured to:
      remove a clock phase that is out of a reference range in a phase identification interval among clocks generated in the clock generator;
      select a minimum clock phase value from each subdivision interval; and
      remove the minimum clock phase value that is out of a specified normal operation range for each subdivision interval.

13. The apparatus of claim 12, wherein the clock generator is configured to generate the clock using the synchronization information comprised in packets received from the first node through a wired network and the delay determined in the delay determiner.

14. The apparatus of claim 12, wherein the delay determiner is further configured to transmit a delay request message to the first node through the interface and receive a delay response message from the first node through the interface, and wherein the delay determiner is configured to determine the delay with the first node based on a request transmit time for transmitting the delay request message, a response receive time for receiving the delay response message, a request receive time at which the first node receives the delay request message, and a request transmit time at which the first node transmits the delay response message, which are determined in the delay response message.

15. The apparatus of claim 12, wherein the clock corrector comprises a phase filter configured to remove the clock phase that is out of a reference range in the phase identification interval.

16. The apparatus of claim 12, wherein the clock corrector comprises a phase filter for replacing the clock phase that is out of a reference range in the phase identification interval with an average clock phase value.

17. The apparatus of claim 12, wherein the clock corrector is configured to determine whether to remove the clock phase using a reference range that is set to have a specified error range on the basis of an average of clock phases of a specified period of time.

18. The apparatus of claim 12, wherein the clock corrector comprises:
   a phase filter configured to remove the clock phase that is out of the reference range in the phase identification interval;
   a set constructor configured to divide the phase identification interval into at least two subdivision intervals;
   a minimum value selector configured to select the minimum clock phase value of each subdivision interval; and
   an output controller configured to output the clock from which the clock phase that is out of the specified normal operation range is removed from each subdivision interval.

19. The apparatus of claim 12, wherein the clock corrector is further configured to determine whether the minimum clock phase value of each subdivision interval is included in a table comprising phase information enabling a normal operation of the second node and discard the minimum clock phase value that is not found in the table.

20. The apparatus of claim 19, wherein the table comprises clock phase information arranged by normal operation temperatures of the second node.

21. The apparatus of claim 12, wherein the clock corrector is further configured to replace the minimum clock phase value with an average minimum clock phase value when the minimum clock phase value is not found in the table.

22. The apparatus of claim 21, wherein the table comprises clock phase information arranged by normal operation temperatures of the second node.

* * * * *